United States Patent
Lanzone et al.

(10) Patent No.: US 7,415,207 B2
(45) Date of Patent: Aug. 19, 2008

(54) DIGITAL CROSS-CONNECT

(75) Inventors: Sergio Lanzone, Genoa (IT); Agostino Damele, Savona (IT); Ghani Abbas, Nottingham (GB)

(73) Assignee: Ericsson AB, Stockholm (SE)

( * ) Notice: Subject to any disclaimer, the term of this patent is extended or adjusted under 35 U.S.C. 154(b) by 638 days.

(21) Appl. No.: 10/250,349

(22) PCT Filed: Dec. 21, 2001

(86) PCT No.: PCT/GB01/05730

§ 371 (c)(1),
(2), (4) Date: Nov. 24, 2003

(87) PCT Pub. No.: WO02/054821

PCT Pub. Date: Jul. 11, 2002

(65) Prior Publication Data

US 2004/0105456 A1    Jun. 3, 2004

(30) Foreign Application Priority Data

Dec. 29, 2000   (GB) ............................... 0031839.4

(51) Int. Cl.
*H04J 14/00* (2006.01)
(52) U.S. Cl. .................. 398/46; 398/51; 398/54
(58) Field of Classification Search .............. 385/17, 385/16, 24; 398/82, 46, 47, 51, 52–54, 57; 370/351, 355, 357, 358, 359, 360
See application file for complete search history.

(56) References Cited

U.S. PATENT DOCUMENTS

| 5,040,170 | A |   | 8/1991  | Upp et al. |
| 5,757,793 | A | * | 5/1998  | Read et al. ................. 370/358 |
| 6,111,673 | A |   | 8/2000  | Chang et al. |
| 6,134,238 | A |   | 10/2000 | Noh |
| 6,606,427 | B1| * | 8/2003  | Graves et al. ................. 385/17 |

FOREIGN PATENT DOCUMENTS

EP      0 907 301 A2    4/1999

(Continued)

OTHER PUBLICATIONS

ITU-T Recommendation G.872: *Architecture of Optical Transport Networks*, ITU-T, pp. 19-20.
Heiles, J., Jones, N: *A Proposal for Virtual Concatenation of STS-3c SPEs*, ITU-T Jul. 14, 2000, pp. 3-4.

(Continued)

*Primary Examiner*—Dalzid Singh
(74) *Attorney, Agent, or Firm*—Kirschstein, et al.

(57) ABSTRACT

A digital cross-connect (DXC) (10) comprises: a plurality of ports (30-100) for receiving/outputting signals and switching and switching means (20) for selectively cross-connecting signals applied to one port to one or more other ports. The cross-connect (10) is characterized in that the switching means (20) comprises a single switching matrix which is arranged to be capable of switching Optical Data Units (ODU). Alternatively or in addition the switching matrix is arranged to be capable of transparently switching complete Synchronous Digital Hierarchy (SDH) synchronous transport modules STM-N and/or complete SONET synchronous transport transport signal STS-N derived from optical carriers OC-N and/or SDH virtual containers VC-3, VC-4, and/or concatenated virtual containers VC-4-nc where n=4, 16, 64 or 256 as defined in ITU-T Recommendation G.707 and/or SONET synchronous transport system STS-1s, STS-nc where n=3, 12, 48, 192 or 768 as defined in Telcordia GR253.

10 Claims, 6 Drawing Sheets

FOREIGN PATENT DOCUMENTS

| | | |
|---|---|---|
| EP | 0 966 122 A2 | 12/1999 |
| EP | 1 091 529 A2 | 4/2001 |
| JP | 6-315177 | 8/1994 |
| WO | WO 95/30318 | 11/1995 |
| WO | WO 96/08902 | 3/1996 |
| WO | WO 98/26509 | 6/1998 |
| WO | WO 99/40697 | 8/1999 |

OTHER PUBLICATIONS

T1M1.3/2000-123. Draft Version 0.7.0 of ITU-T Recommendation G.709, ITU-T, Aug. 7, 2000, pp. 91, 95, 98.

*An Asynchronous DS3 Cross-Connect System With ADD/DROP Capability*, Y. Rokugo, et al., Overseas Transmission Division, NEC Corporation, pp. 47.4.1-47.4.4, p. 1555-1558.

* cited by examiner

DIGITAL CROSS-CONNECT

BACKGROUND OF THE INVENTION

The present invention relates to a digital cross-connect.

SUMMARY OF THE INVENTION

According to a first aspect of the present invention there is provided a digital cross-connect comprising: a plurality of ports for receiving/outputting optical traffic signals, each port being configured for receiving/outputting optical traffic signals of a selected type from a plurality of different types (e.g. STM-N, OC-n, OTM.); and switching means for selectively cross-connecting signals received at one port to one or more other ports, the cross-connect being characterized by each port including: means for converting the optical traffic signals received at each port into a corresponding electrical signal; means for converting the electrical signals into an internal frame structure for selective cross-connection by the switching matrix to the one or more other ports; means for converting said frame structure cross-connected to the selected port into a signal of the type appropriate to said port for output therefrom; and means for converting the electrical signals into a corresponding optical traffic signal for output from the port, wherein the various different types of optical traffic signals are cross-connected by the same switching matrix. The use of an internal frame structure into which all the different type of traffic signals are mapped (converted) for switching, enables a single switching matrix to cross-connect any of a plurality of different types of optical traffic signals.

Advantageously, one or more of the ports is/are for receiving/outputting optical traffic signals comprising Optical Data Units (ODU), the cross-connect being capable of switching ODUs. ODU-k can carry SDH, Asynchronous Transfer Mode (ATM), Internet Protocol (IP) or Ethernet as defined in ITU-T G.709. Accordingly the digital cross-connect (DXC) of the present invention permits the cross-connection of all types of traffic mapped in the ODU using a single switching matrix. For example ATM cells can be switched without a dedicated ATM switching matrix. The capacity to cross-connect ODU-k allows to route SDH/SONET, ATM, IP and Ethernet signals inside the same switching matrix without the necessity to integrate in the same equipment different switching matrix. This permits also to have the same performance parameters to monitor different types of signals (SONET/SDH, ATM, IP, Ethernet). Since the DXC of the present invention permits the switching of the basic information structure of the emerging Optical Transport Network (OTN): the Optical Data Unit (ODU-k) as defined in emerging ITU-T G.709 Rec.; it can therefore be considered to be equivalent as an ODU-1/2/3 or higher DXC.

Preferably, one or more of the ports is/are for receiving/outputting optical traffic signals comprising Synchronous Digital Hierarchy (SDH) synchronous transport modules STM-N, the cross-connect being capable of transparently switching complete STM-N.

Moreover, the cross-connect preferably has one or more ports for receiving/outputting optical traffic signals comprising SONET synchronous transport signal STS-N derived from optical carriers OC-N, the cross-connect being capable of transparently switching complete STS-N.

Transparent switching is the capability to switch complete STM-N and/or STS-N signals as they are without any processing of the overhead bytes (i.e. no termination of Multiplex section (MS) and Regeneration Section (RS); only non-intrusive monitoring is performed).

Preferably, the cross-connect according is further characterized in that it is capable of switching SDH virtual containers VC-3, VC-4, and/or concatenated virtual containers VC-4-nc where n=4, 16, 64 or 256 as defined in ITU-T Recommendation G.707 and/or SONET synchronous transport system STS-1s, STS-nc where n=3, 12, 48, 192 or 768 as defined in Telcordia GR253.

Advantageously, the cross-connect further comprises means for checking the integrity of the switching. Preferably, the cross-connect comprises means for non-intrusively monitoring the traffic signals being switched.

The cross-connect advantageously further comprises means for synchronising and justifying the traffic signals being switched.

Preferably the cross-connect further comprises switch protection means.

Advantageously, one or more of the ports is configured for receiving/outputting optical traffic signals comprising Optical Transport Modules (OTM), said port/s further comprising means for extracting Optical Data Units (ODU-ks) from the OTM signal and means for multiplexing and de-multiplexing ODUs.

Moreover, the cross-connect preferably includes means for providing automatic path set-up which utilizes General Multi Protocol Label Switching (GMPLS) or a signalling channel.

The cross-connect, in addition to the classic SNCP protection at VC-4/VC-3 level, is advantageously further able to perform path protections at the ODU level. In a Source (receive) direction the switching matrix performs the bridge (cross-connection) of the ODU for the 1+1 ODU SNCP, while in a Sink (output) direction, the selection is performed based on the monitoring of the quality of the "working" and of the "protecting" ODUs. Protection of "transparently" switched STM-N/OC-N is likewise based on the same concepts: bridging and selection based on quality monitoring.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
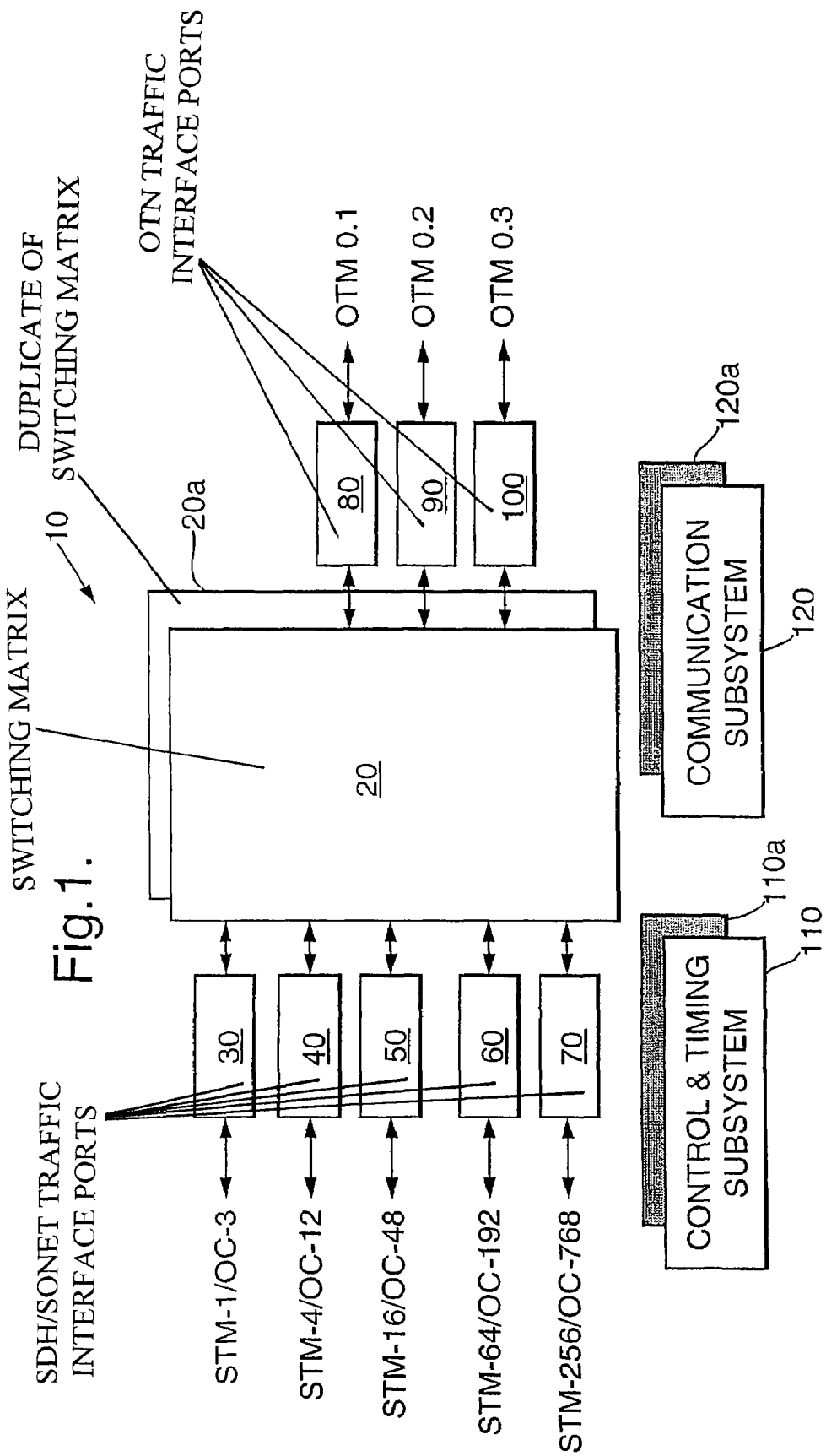
FIG. 1 shows a schematic representation of the functional blocks of a digital cross-connect (DXC) in accordance with the invention.

Referring to FIG. 1 there is shown a schematic functional block diagram of a digital cross-connect (DXC) 10 in accordance with the invention. The DXC 10 is intended to provide cross-connection of optical traffic between SDH/SONET and OTN optical communications networks. The DXC 10 comprises: an electrical switching matrix 20 for performing the switching functionality; five SDH/SONET traffic interface ports 30-70 connected to the switching matrix 20; three OTN traffic interface ports 80-100 connected to the switching matrix 20; a block 110 for providing synchronisation, control and management of the DXC; and a communication subsystem 120 to enable communication with external equipment such as for example a remote management system to enable remote configuring of the DXC.

In the embodiment illustrated the traffic interface ports 30-70 are respectively for receiving/outputting optical SDH/SONET STM-1/OC-3, STM-4/OC-12, STM-16/OC-48, STM-64/OC-192 and STM-256/OC-768 signals. The traffic interface ports 80-100 are for receiving/outputting OTN OTM0.1 (2.5 Gbit/s), OTM0.2 (10 Gbit/s) and OTM0.3 (40 Gbit/s) optical signals respectively. The DXC provides cross-connection of traffic signals received at one port to one or more of the other ports. As will be appreciated that the DXC 10 allows bi-directional cross-connection between traffic ports although for ease of description the traffic ports 30-70 will hereinafter be referred to as input ports and the traffic ports 80-100 referred to as output ports.

Each port 30-100 includes optical to electrical (O/E) conversion means for converting optical signals received thereat into corresponding electrical signals that, after appropriate processing (e.g. extracting ODU-k from OTM-n signals), are cross-connected by the switching matrix. Each port 30-100 additionally includes electrical to optical E/O) conversion means for converting electrical signals constructed from what is cross-connected to the interface port (e.g. constructing OTM-n from ODU-k) into corresponding optical signals for output therefrom.

The Switching Matrix 20 comprises a three-stage Clos architecture, and it allows cross-connections for an initial capacity of 8192 STM-1 equivalent signals.

Operation of the DXC will now be described with reference to an optical signal received at an input port which is to be selectively cross-connected to an output port. In order to perform the cross-connection either at SDH VC-n, SONET STS-n or OTN ODUk level or the transparent switching of STM-n and/or OC-n signals, the DXC performs the following actions. Actions (a)-(c) are performed by the input traffic interface, (d) by the switching matrix and (e)-(g) by the output traffic port.

(a) The payload signal (PLD) is demodulated from the optical signal received at the input port and converted into a corresponding electrical signal by the O/E conversion means.

(b) The electrical signal is aligned using a Frame Alignment Word that permits the input port to identify the beginning of each frame within the electrical signal.

(c) The electrical signal is processed as appropriate (i.e. depending on the types of port and the types of traffic being switched) and mapped (converted) into an internal frame structure that is generated by the input port. The internal frame is structured such as to permit the transport of all the possible traffic formats across the switching matrix i.e. SDH VC3, VC-4, VC-nc, where n=4, 16 or 64, 256 as defined in ITU-T Recommendation G.707, SONET STS-1s, STS-nc, where n=3, 12, 48 or 192, 768 as defined in Telcordia GR-253, OTN ODUk, where k=1, 2 or 3 as defined in ITU-T G.709, STM-N where n=16, 64 or 256 and OC-n where n=48, 192 or 768. The internal frame structure comprises a plurality of time slots and each type of traffic format to be cross-connected uses a defined number of time slots.

(d) The switching matrix cross-connects the traffic signal to the selected output port/s by cross-connecting the time slots to the selected output port/s.

(e) The output port extracts from the internal frame the cross-connected traffic.

(f) Depending on the type of traffic being cross-connected (incoming traffic) and the type of traffic signal appropriate to the output port (outgoing traffic), the output port performs different actions. For example in case of a incoming VC-n signal being cross-connected to an SDH outgoing traffic signal the output port generates the Multiplex Section (MS) and Regeneration Section (RS) as defined by ITU-T G.783, while in case of ODUk incoming traffic being cross-connected to an outgoing OTN traffic signal the output port generates the Optical Transport Unit (OTU) as defined by ITU-T G.798. Depending on the type of the outgoing traffic signal the relevant Frame Alignment Word is inserted.

(g) Finally the electrical outgoing traffic signal is converted into a corresponding optical signal by the electrical to optical conversion means.

Since the internal frame is configured such as to allow transport of any traffic signal type, this enables a single switching fabric to cross-connect different traffic signals. This ability to switch signals of different types without any external processing makes the DXC 10 of the present invention equivalent to an optical cross-connect (OXC) with the additional capability to perform monitoring on the quality of the switched signals. The DXC of the invention merges the benefits of an electrical/digital core/switching matrix (e.g. easier performance monitoring and fault location, traffic grooming, wavelength conversion, regeneration of the signals) and the key benefit, typical of an OXC, of data rate transparency.

Figure 2:
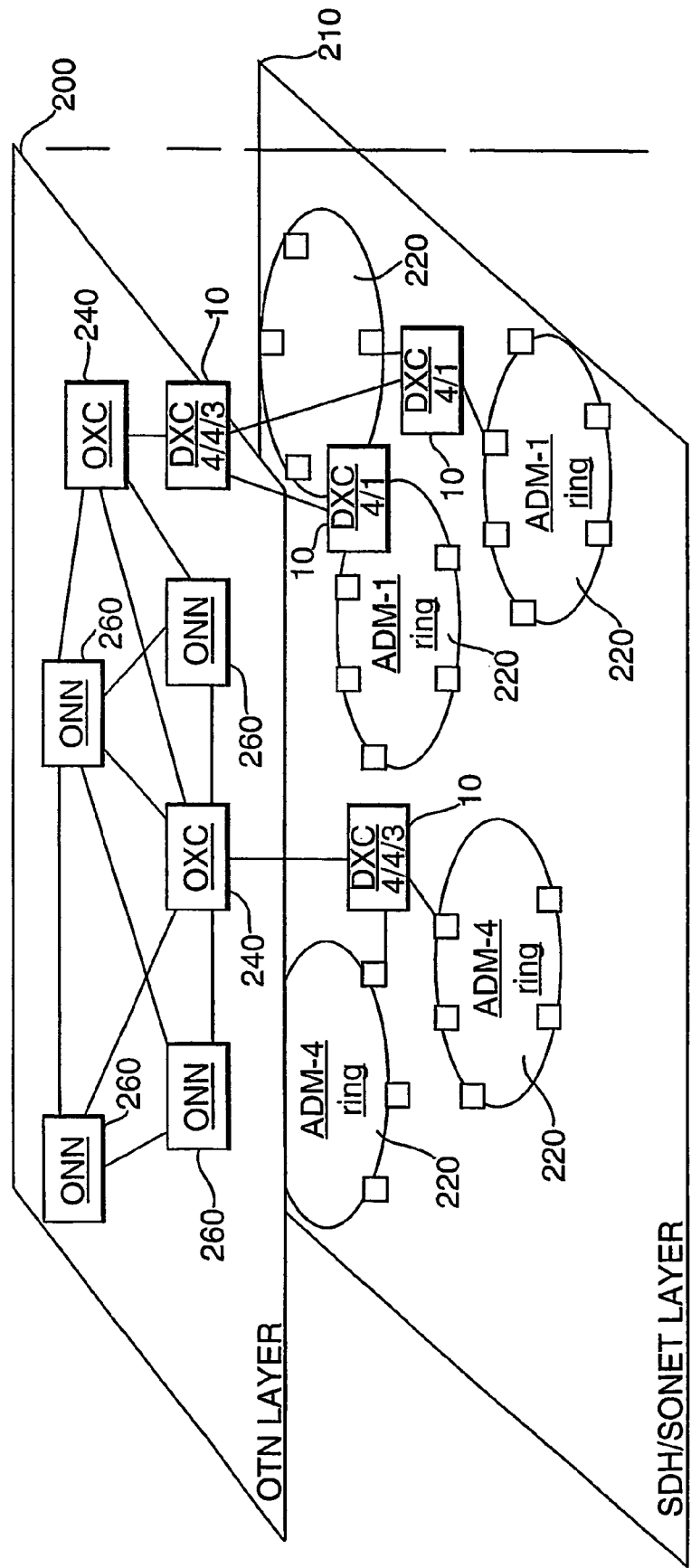
FIG. 2 shows network layer interconnections using optical cross-connects (OXCs) and DXCs 4/4/3 and 4/1 in accordance with the invention.
Figure 3:
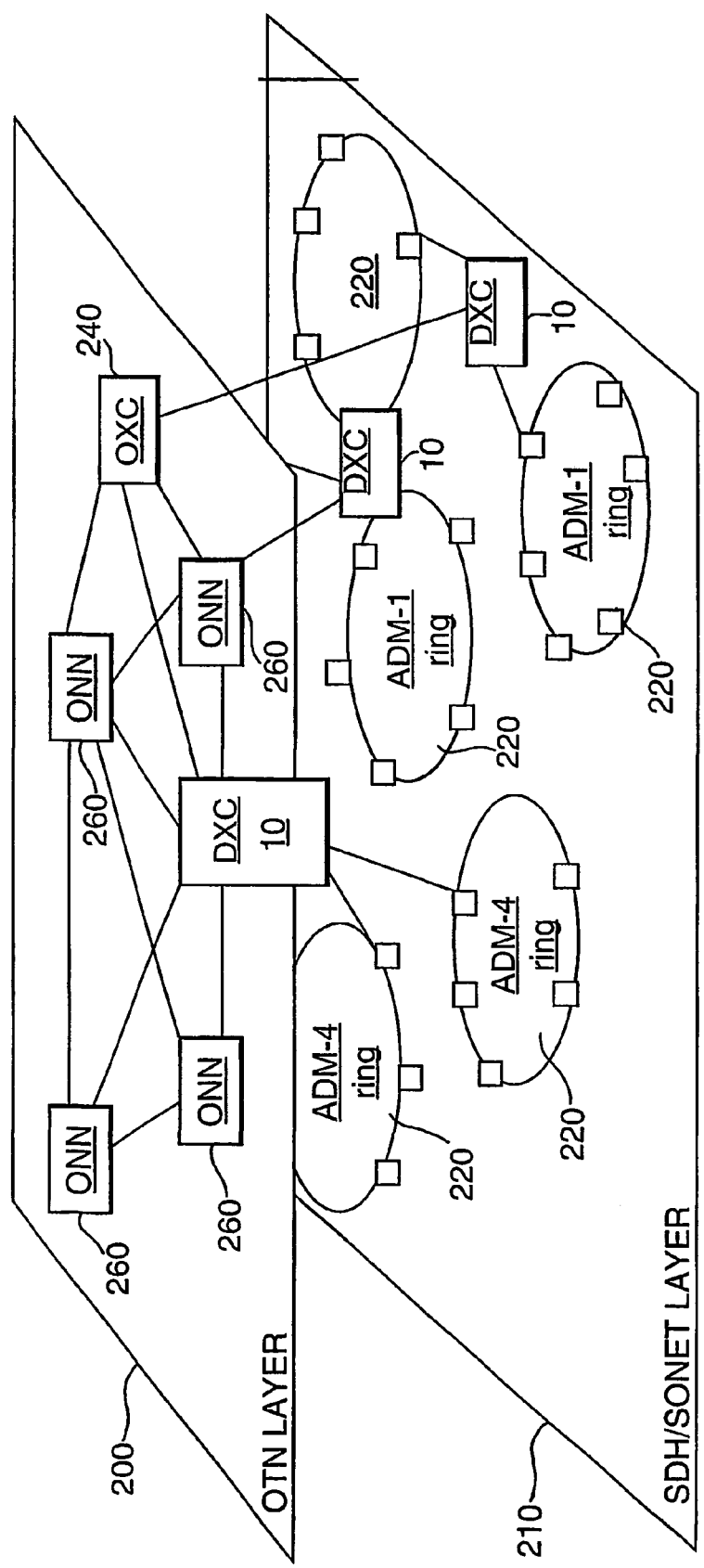
FIG. 3 shows network layer interconnections using DXCs in accordance with the invention.
Figure 4:
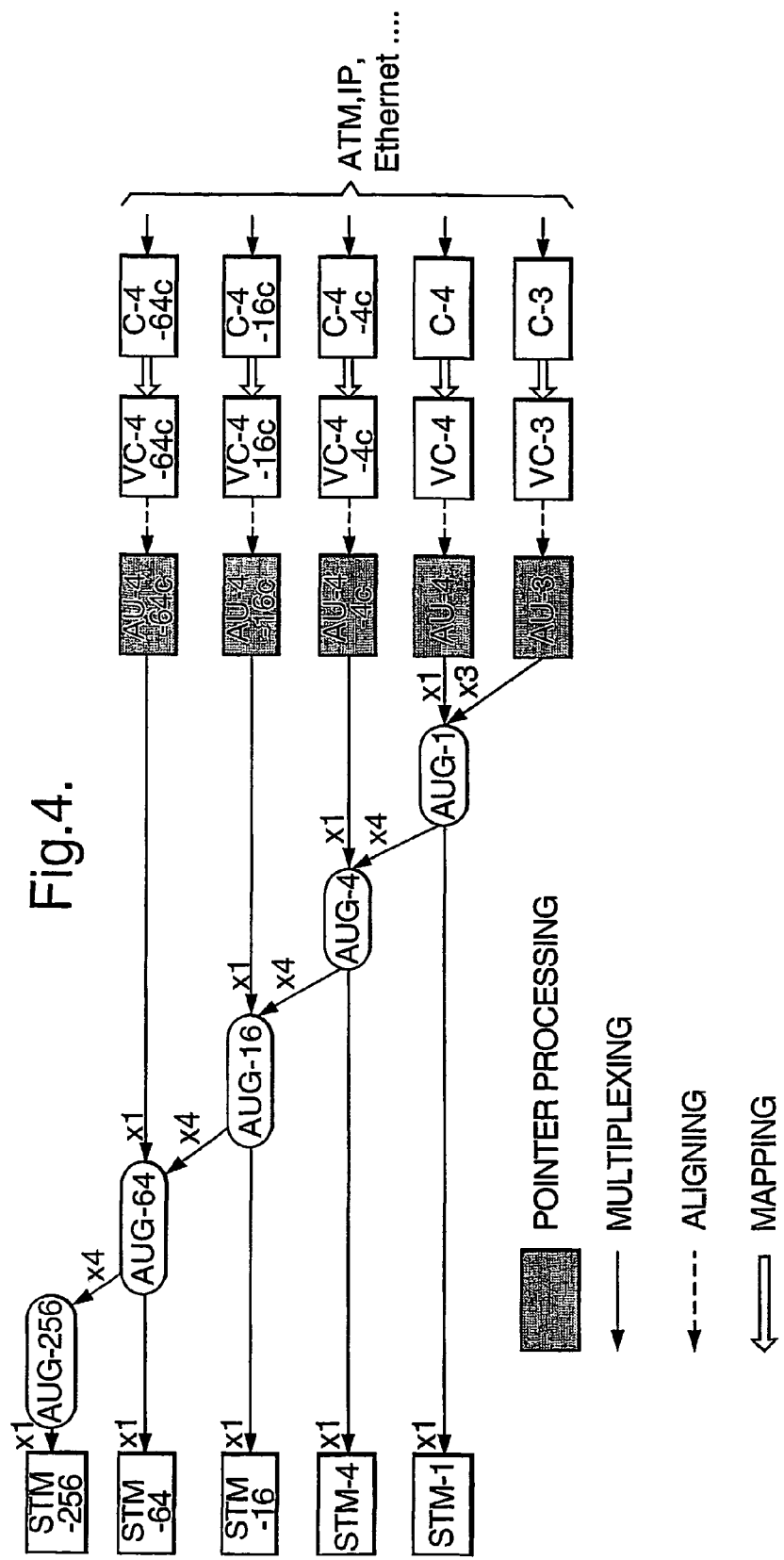
FIG. 4 shows an SDH multiplexing structure according to ETSI.

The capability to map/de-map SONET/SDH, ATM, IP, Ethernet into ODU containers makes the DXC 10 the main candidate to be used as a link point between the optical backbone and the lower layers of a communications network. FIGS. 2 and 3 illustrate examples of how the DXC 10 can be used to link the optical backbone 200 (National Layer OTN) and the lower Regional 210 (SDH/SONET) layers of a communications network. In the examples illustrated the Regional layer 210 comprises a number of SDH/SONET ring networks 220 whilst the National layer comprises a network of interconnected optical cross-connects 240 (OXC) and optical network nodes 260 (ONN). As will be appreciated from these Figures the DXC 10 can be used to provide cross-connection between rings/ONN within the regional and national layers as well as cross-connection between the layers. The capability of the DXC to map/de-map STM-N and or OC-N into ODU-k, the possibility to terminate them and to cross-connect at VC-4/VC-3 level enables the functionality performed by an Optical Cross-connect and a DXC 4/4/3 to be integrated into a single switch arrangement.

The DXC 10 of the present invention is a multi-service opto-electrical (O-E-O) cross-connect, combining both lambda level switching with lower order granularity switching, based on an initial capacity (bandwidth) of 8192 STM-1 equivalent ports (i.e., 1280 Gbit/s 512×STM16).

The DXC provides transparent switching of direct wavelengths (for example, data over λ) and SDH/SONET. Each wavelength is capable of handling the OTM0.k overhead (also known as Digital Wrapper) and out of band Forward Error Correction (FEC), according to ITU-T G.709 Standard (Approved February 2001). Transparent switching of STM-16/STM-64/STM-256 and the equivalent OC-N signals is also provided.

Both SDH management and the emerging General Multi-Protocol Label Switching (GMPLS) control mechanisms are included together with a wide range of other optical and equipment protection mechanisms for inter-working to the SDH layer.

The DXC is configured to perform the functional requirements of ITU-T Recommendations G.783, G.958, and G.784.

Figure 5:
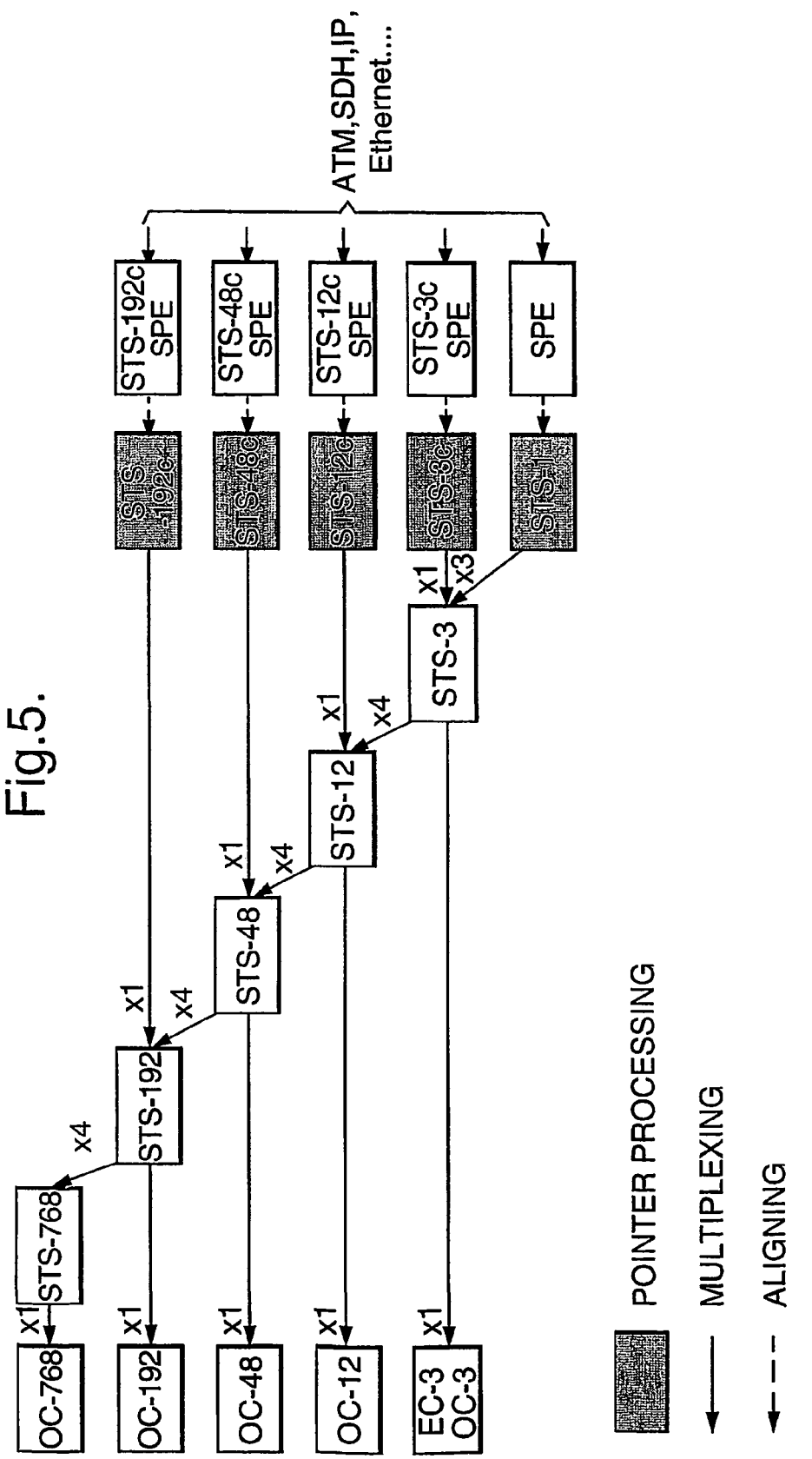
FIG. 5 shows a SONET multiplexing structure according to Telcordia.

STM-N signals are structured according to ITU-T Recommendation. G.707. The DXC is arranged to implement the multiplexing routes specified by ETSI ETS 300 147 and G.707 as represented in FIG. 5 for multiplexing to STM-1 to STM-256. Furthermore the DXC is able to support SONET mapping in accordance with Telcordia as illustrated in FIG. 6.

Figure 6:
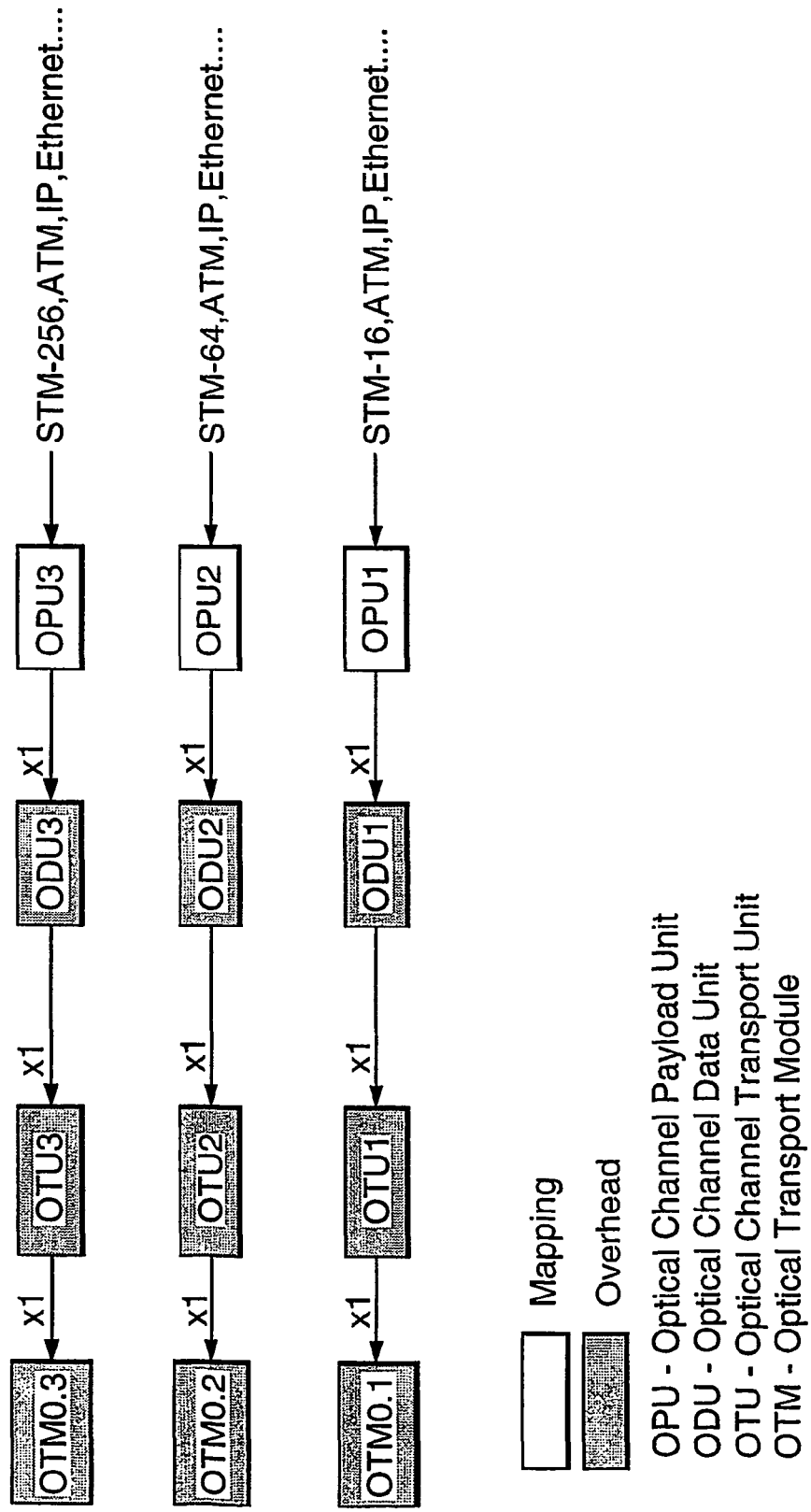
FIG. 6 shows an Optical Transport Network (OTN) multiplexing structure according to ITU-T G.709.

Currently G.709 (year 2000 version) defines a number of ODU-k s for various bit-rates starting at a nominal value of 2.5 Gbit/s (see FIG. 6). For example ODU-1 (where k=1) is defined to transport a signal of a nominal bit rate of 2.5 Gbit/s. Similarly, ODU-2 is defined for the transport of 10 Gbit/s signals and ODU-3 for the transport of 40 Gbit/s signals. It is also possible to multiplex four ODU-1s into a single optical payload unit OPU-2 or 16 ODU-1s into a single OPU-3. Similarly four ODU-2s can be multiplexed into a single OPU-3. Therefore in order to switch the contents of the ODUs it is necessary to terminate the incoming ODUs and to de-multiplex the basic parts contained in its OPU. For example an incoming ODU-2 which is made up of four ODU-1s is first de-multiplexed to four ODU-1s and then switched. The process of multiplexing and de-multiplexing is carried out at the interfaces 80-100 to the switch fabric 20.

In the following the actions required for multiplexing of four ODU-1s into an ODU-2 is described:

1. The four incoming ODU-1s are adapted to a common clock by means of the justification mechanism of the internal frame. This process either adds or deletes data or stuff bytes to the payload.

2. After cross connection the four ODU-1s are adapted to the ODU-2 bit rate and multiplexed:

The outgoing signals are justified to a common clock where data or stuff bytes are either added or deleted to the outgoing data.

The justification process uses positive/zero/negative justification as defined in ITU-T G.709. The multiplexing process may use bit or byte interleaving. In this process each bit or byte from the n signals to be multiplexed is interleaved one at a time to produce the aggregate signal. This process is performed at the output traffic port.

In the case of de-multiplexing, the ODU-2 is terminated, the ODU-1s are de-multiplexed and extracted using the information contained into the OPU2. The ODU-1s are adapted to the internal frame by means of a justification mechanism.

The same can be applied to all the ODU multiplexing.

Fault location in the DXC equipment is based on on-line diagnostic tests related to the functionality of control, timing, switching, and to internal connections. The DXC equipment can perform defect detection and performance monitoring features.

Internal and external loops are available for fault localization purposes between transport network and equipment. The quality of the incoming signals is continuously monitored at the equipment ports and the relevant data, after having been processed, are made available to the control centre for subsequent network performance evaluations. At the traffic ports 30-100 an internal frame is constructed containing the ODUs or STM-N/OC-N signals etc and an extra byte called flag byte is inserted in the re-structured frame. The flag byte is used for checking the integrity of the cross-connection.

All configurable parameters and the status of the system are monitored and controlled via the LCT or a remote management system (the NMS), via a dedicated access (Q interface or $Q_{ECC}$ channel). The DXC 10 can be equipped with a set of dual-clock units performing the handling of either SONET/SDH or ITU-T G.709 signals. As an example, the following units are provided:

STM-256/OC-768/OTM-0.3;
STM-64/OC-192/OTM-0.2;
STM-16/OC-48/OTM-0.1.

Gigabit-Ethernet and other data interfaces can be supported as well.

The basic functional requirements for the DXC Switching Matrix 20 subsystem are:

non-blocking: the probability that a particular connection request cannot be met is 0;

full connectivity: it is possible to connect any input to each available output;

time sequence integrity (concatenated payloads): concatenated payloads are switched without breaking the time sequence integrity;

assured correctness of cross-connections: correct cross-connections between the right traffic ports is assured.

The DXC is designed to reach a switching capacity of 8192×STM-1 in a scalable way and to be in service upgraded to support up to, for example, 2500 Gbit/s (1024×STM-16) and beyond.

The main intended application of the DXC of the present invention is the provision of an automatic reconfiguration of channels through the network. Semi-permanent time-limited connections can be realised under a pre-programmed command. In general, these functions are intended to be provided under the control of an external NMS or by means the emerging GMPLS (General multi protocol label switching) mechanism. Also GMPLS Fast Restoration can be provided as well. Alarms raised by the DXC and the related processing are based on ITU-T G.783 and G.784 requirements for SDH signals, and on ITU-T G.798 for OTM-N signals.

Alarms from each unit are collected and processed by the Central Control Unit (not shown), which performs the following functions:

alarm inhibition;

assignment of a category (e.g., urgent, not urgent) to each alarm;

alarm reduction (removal of consequential alarms);

alarm prioritisation: a priority value is assigned to each alarm, depending on its type and source;

alarm filtering, logging and reporting: capability of selecting, through the above mentioned priorities, the alarm destination (the NMS and/or the local alarm log and/or the LCT); the operator will be informed that an alarm exists; driving of equipment alarm displays and ground contacts.

All the alarm processing functions can be configured via NMS or LCT. A cyclic local alarm log is available within the equipment. Alarms can be indicated by lamps/ground contacts, sent to the LCT and to the NMS. Visual indications are provided to indicate both the alarmed equipment and, in case of internal fault, the affected unit. Either by the LCT or by the NMS, the operator will be supported during the maintenance operation, e.g., with fault location and testing functions.

The DXC is configured in order to guarantee a high level of availability. Accordingly all the common parts of the equipment, i.e., the Switching Matrix 20, 20a, and the Control 110, 110a and Communication and Synchronisation subsystems 120, 120a, are fully duplicated (see FIG. 1). The functionality of the equipment 10 is monitored by an alarm system and by built-in test patterns, which allow the cross-connected paths between the ports 30-100 to be monitored in service without affecting traffic in any way.

The protected units within the equipment 10 are: 1+1 for the Switching Matrix subsystem 20; Q and QECC management for the units for Control, Communication and Timing 110, 120; 1+1 for connection to peripheral sub-racks, and Power Supply; and 1+1 on the port sub-racks and the units for Control and connections to the switch. Furthermore the DXC includes facilities to permit the network protection at each traffic level (e.g., VC-n and STM-N).

In addition to the standard SDH protections (i.e. MSP and SNC-P), features for the protection of entire STM-N signal are provided. In order to enable integration of the DXC of the present invention into the Optical Transport Network (OTN) a wide range of optical protection mechanisms is provided including GMPLS Fast Restoration.

The switch matrix 20 is duplicated 20a and any defect on the working switch matrix is detected and protection is activated. Hitless switching is performed where the protection switch matrix becomes active. An alarm or a report is generated and sent to the local or remote management system. The term hitless means no errors are introduced in the data when the protection switching process is activated. The defect can be a result of too high an error rate, miss-connection, power failure etc.

One of the main features of the DXC of the present invention is a capacity to perform Performance Monitoring, typical of a classic SDH/SONET equipped, embedded into a "photonic" equipment. There are a number of bytes in the SDH frame which provide performance information about the STM-N/OC-N signals (refer to ITU-T Recommendations G.707 and G.783 for detail). The DXC provides means to monitor non-intrusively these bytes (e.g. B1, J0, B2, J1, B3 etc.). Performance Monitoring and Management is in accordance with ITU-T Recommendations. G.784, G.826, G.828 and G.829.

Performance Management refers to the capability of controlling the Performance Monitoring process by means of the generation of performance data, the reporting of performance data, and the reporting of threshold crossing. Performance Monitoring based on ODU/OTU bytes (as defined in G.709) are provided as well.

The DXC can be controlled and monitored via:
an F interface to a LCT (Personal Computer equipped with UNIX or MS-Windows NT operating system and application software);
Q interface, to the NMS; on the basis of ITU-T Recommendations. Q.811 and Q.812 (formerly in ITU-T G.773);
QECC (from an STM-N interface), as defined by ITU-T Recommendation. G.784; or by
GMPLS (General Multi-Protocol Label Switching) mechanism.
Further, the equipment 10 supports a TCP/IP interface.

To speed up the process of setting up path end-to-end across the network, automatic techniques based on a GMPLS technique or the signalling channel can be employed. The command to set a connection is communicated to the switching matrix through a communications card (not shown). The command message can be transported by GMPLS or the signalling channel. It can also be communicated to the DXC by the network management system through the communications card or the Q-interface.

It will be appreciated that the DXC of the present invention is not limited to the specific embodiment described and that variation can be made which are within the scope of the invention. For example interface ports for different types of communication traffic can be used depending upon the intended application for the DXC such as for example a cross-connect intended to cross connect OTM as defined in G.709 or STM/OC or a combination of such traffic.

The invention claimed is:

1. A digital cross-connect, comprising:
   a) a plurality of optical traffic ports for receiving/outputting optical traffic signals, each optical traffic port being configured for receiving/outputting optical traffic signals of a selected type from a plurality of different types;
   b) switching means for selectively cross-connecting optical traffic signals received at one port to at least one other optical traffic port, the switching means comprising a three-stage Clos architecture electrical time division multiplexing switching matrix for selectively cross-connection, in a single fabric and at the same time, the traffic signals of different technologies and hierarchies, received at the one port to the at least one other optical traffic port; and
   c) each optical traffic port including:
      i) means for converting the optical traffic signals received at each port into a corresponding first electrical signal;
      ii) means for converting the first electrical signal into an internal frame structure for selective cross-connection by the switching matrix to said at least one other port;
      iii) means for converting electrical signals having the frame structure which has been cross-connected to said at least one other traffic port into a second electrical signal of the type corresponding to the traffic for which said at least one other traffic port is configured to output therefrom;
      iv) means for converting the second electrical signal into a corresponding optical traffic signal for output from said at least one other optical traffic port; and
      v) the various different types of the optical traffic signals being cross-connected by the same electrical switching matrix.

2. The cross-connect according to claim 1, wherein at least one of the optical traffic ports is for receiving/outputting optical traffic signals comprising optical data units (ODUs), and wherein the internal frame structure is selected such as to allow the ODUs to be cross-connected.

3. The cross-connect according to claim 1, wherein at least one of the optical traffic ports is for receiving/outputting optical traffic signals comprising synchronous digital hierarchy (SDH) synchronous transport modules (STM-N), and wherein the internal frame structure is selected such as to allow complete STM-N to be cross-connected transparently.

4. The cross-connect according to claim 1, and further comprising means for checking integrity of the switching.

5. The cross-connect according to claim 1, and further comprising means for non-intrusively monitoring the traffic signals being switched.

6. The cross-connect according to claim 1, and the traffic ports further comprising means for synchronizing and justifying the traffic signals being switched.

7. The cross-connect according to claim 1, and further comprising switch protection means.

8. The cross-connect according to claim 1, wherein at least one of the optical traffic ports is configured for receiving/outputting optical traffic signals comprising optical transport modules (OTM), said at least one traffic port further comprising means for extracting optical data units (ODU-ks) from the OTM signal, and means for multiplexing and de-multiplexing the ODUs-ks.

9. The cross-connect according to claim 1, and further comprising means for providing automatic path set-up which utilizes a signaling channel.

10. The cross-connect according to claim 1, wherein the traffic signals of different technologies and hierarchies are selected from a group consisting of: synchronous optical networking (SONET), synchronous digital hierarchy (SDH), and optical transport network (OTN).

* * * * *

UNITED STATES PATENT AND TRADEMARK OFFICE
CERTIFICATE OF CORRECTION

PATENT NO. : 7,415,207 B2
APPLICATION NO. : 10/250349
DATED : August 19, 2008
INVENTOR(S) : Lanzone et al.

It is certified that error appears in the above-identified patent and that said Letters Patent is hereby corrected as shown below:

On the Title Page, in Item (57), under "ABSTRACT", in Column 2, Lines 1-17, delete "A digital cross-connect (DXC) (10) comprises: a plurality of ports (30-100) for receiving/outputting signals and switching and switching means (20) for selectively cross-connecting signals applied to one port to one or more other ports. The cross-connect (10) is characterized in that the switching means (20) comprises a single switching matrix which is arranged to be capable of switching Optical Data Units (ODU). Alternatively or in addition the switching matrix is arranged to be capable of transparently switching complete Synchronous Digital Hierarchy (SDH) synchronous transport modules STM-N and/or complete SONET synchronous transport transport signal STS-N derived from optical carriers OC-N and/or SDH virtual containers VC-3, VC-4, and/or concatenated virtual containers VC-4-nc where n=4, 16, 64 or 256 as defined in ITU-T Recommendation G.707 and/or SONET synchronous transport system STS-1s, STS-nc where n=3, 12, 48, 192 or 768 as defined in Telcordia GR253." and insert -- A digital cross-connect includes a plurality of ports for receiving/outputting signals and a switch for selectively cross-connecting signals applied to one port to one or more other ports. The switch comprises a single switching matrix which is arranged to be capable of switching Optical Data Units (ODU). Alternatively, or in addition, the switching matrix is arranged to be capable of transparently switching complete Synchronous Digital Hierarchy (SDH), synchronous transport modules STM-N and/or complete SONET synchronous transport signals STS-N derived from optical carriers OC-N and/or SDH virtual containers VC-3, VC-4, and/or concatenated virtual containers VC-4-nc, where n=4, 16, 64 or 256 as defined in ITU-T Recommendation G.707 and/or SONET synchronous transport system STS-ls, STS-nc where n=3, 12, 48, 192 or 768 as defined in Telcordia GR253. --, therefor.

In Column 3, Line 25, delete "E/O)" and insert -- (E/O) --, therefor.

In Column 3, Line 56, delete "VC-nc," and insert -- VC-4-nc, --, therefor.

UNITED STATES PATENT AND TRADEMARK OFFICE
CERTIFICATE OF CORRECTION

PATENT NO. : 7,415,207 B2
APPLICATION NO. : 10/250349
DATED : August 19, 2008
INVENTOR(S) : Lanzone et al.

It is certified that error appears in the above-identified patent and that said Letters Patent is hereby corrected as shown below:

In Column 8, Lines 14-15, in Claim 1, delete "cross-connection," and insert -- cross-connecting, --, therefor.

Signed and Sealed this

Thirty-first Day of March, 2009

JOHN DOLL
*Acting Director of the United States Patent and Trademark Office*